United States Patent
Katayama

(10) Patent No.: US 8,270,985 B2
(45) Date of Patent: Sep. 18, 2012

(54) WIRELESS COMMUNICATION APPARATUS AND METHOD

(75) Inventor: Masahide Katayama, Yokohama (JP)

(73) Assignee: Kyocera Corporation, Kyoto (JP)

( * ) Notice: Subject to any disclaimer, the term of this patent is extended or adjusted under 35 U.S.C. 154(b) by 281 days.

(21) Appl. No.: 12/593,750

(22) PCT Filed: Mar. 26, 2008

(86) PCT No.: PCT/JP2008/055773
§ 371 (c)(1),
(2), (4) Date: Mar. 9, 2010

(87) PCT Pub. No.: WO2008/120646
PCT Pub. Date: Oct. 9, 2008

(65) Prior Publication Data
US 2010/0159974 A1   Jun. 24, 2010

(30) Foreign Application Priority Data

Mar. 29, 2007   (JP) .................. 2007-089038

(51) Int. Cl.
*H04W 72/00* (2009.01)
*H04K 3/00* (2006.01)
(52) U.S. Cl. .................. 455/450; 455/436; 455/509
(58) Field of Classification Search .......... 455/436, 455/450, 452.1, 452.2, 453, 509, 512, 513
See application file for complete search history.

(56) References Cited

U.S. PATENT DOCUMENTS
5,280,630 A * 1/1994 Wang .................. 455/452.2

FOREIGN PATENT DOCUMENTS

| | | |
|---|---|---|
| JP | 04-027236 | 1/1992 |
| JP | 2002-058061 | 2/2002 |
| JP | 2003-052069 | 2/2003 |
| JP | 2003152732 A | 5/2003 |
| JP | 2004-336814 | 11/2004 |
| JP | 2005244958 A | 9/2005 |
| JP | 2006-333008 | 12/2006 |
| WO | WO 98/30047 A1 | 7/1998 |

OTHER PUBLICATIONS

Japanese language office action dated Aug. 23, 2011 and its English language translation for corresponding Japanese application 2009507485 cites the foreign patent document above.
Japanese language office action dated Feb. 14, 2012 and its English language translation issued in corresponding Japanese application 2009507485 cites the foreign patent document above.

* cited by examiner

*Primary Examiner* — Lee Nguyen
(74) *Attorney, Agent, or Firm* — DLA Piper LLP (US)

(57) ABSTRACT

A wireless communication apparatus 10 having a plurality of frequency channels and being capable of wireless communication with a plurality of different terminals includes a channel allocation control unit 15 for allocating a different frequency channel to a terminal in a different rank based on a rank indicating a priority of communication quality of the terminal.

2 Claims, 9 Drawing Sheets

| | User's rank (service name example) | Communication quality | Price |
|---|---|---|---|
| Service A | Platinum user | AAA | High |
| Service B | Gold user | AA | Slightly high |
| Service C | Silver user | A | Average |
| Service D | Bronze user | B | Low |

FIG.2

| | User's rank (service name example) | Communication quality | Price |
|---|---|---|---|
| Service A | Platinum user | AAA | High |
| Service B | Gold user | AA | Slightly high |
| Service C | Silver user | A | Average |
| Service D | Bronze user | B | Low |

FIG. 3

| | Channel for bronze user | | Channel for silver user | | Channel for gold user | | Channel for platinum user | |
|---|---|---|---|---|---|---|---|---|
| | $f_1$ | $f_2$ | $f_3$ | $f_4$ | $f_5$ | $f_6$ | $f_7$ | $f_8$ |
| Time slot (3TS) | 4(SC) | 4(SC) | 3(SC) | 3(SC) | 2(SC) | 2(SC) | 1(SC) | 1(SC) |
| | 4(SC) | 4(SC) | 3(SC) | 3(SC) | 2(SC) | 2(SC) | 1(SC) | 1(SC) |
| | 4(SC) | 4(SC) | 3(SC) | 3(SC) | 2(SC) | 2(SC) | 1(SC) | 1(SC) |

Frequency channel (8CH)

FIG. 9

|  | Time slot (3TS) → | | |
|---|---|---|---|
| $f_1$ | 3(SC) | 3(SC) | 3(SC) |
| $f_2$ | 3(SC) | 3(SC) | 3(SC) |
| $f_3$ | 3(SC) | 3(SC) | 3(SC) |
| $f_4$ | 3(SC) | 3(SC) | 3(SC) |
| $f_5$ | 3(SC) | 3(SC) | 3(SC) |
| $f_6$ | 3(SC) | 3(SC) | 3(SC) |
| $f_7$ | 3(SC) | 3(SC) | 3(SC) |
| $f_8$ | 3(SC) | 3(SC) | 3(SC) |

Frequency channel (8CH)

WIRELESS COMMUNICATION APPARATUS AND METHOD

CROSS REFERENCE TO RELATED APPLICATION

This application is a national stage of international application No. PCT/JP2008/055773 filed on Mar. 26, 2008, the entire contents of which are incorporated herein by reference. This application also claims priority to and the benefit of Japanese Patent Application No. 2007-89038 filed on Mar. 29, 2007, the entire contents of which are incorporated herein by reference.

TECHNICAL FIELD

The present invention relates to a wireless communication apparatus establishing a digital communication path between a base station having an antenna array composed of a plurality of antennas and a wireless terminal and a control method thereof.

BACKGROUND ART

Currently, as a communication system which complies with a wireless communication standard employing a communication system of TDMA-TDD (Time Division Multiple Access-Time Division Duplex (hereinafter abbreviated as "time division multiplex")), PHS (Personal Handyphone System) and i-Burst (registered trademark) system are mainly exemplified. These specifications are defined in ARIB STD-28 of Association of Radio Industries and Businesses (ARIB). Particularly, in American National Standards Institute (ANSI)/ATIS (Alliance for Telecommunications Industry Solutions), the i-Burst system is prepared under the name of HC-SDMA (High Capacity-Spatial Division Multiple Access) and being standardized by WTSC-2005-032.

Particularly, the i-Burst system uses an adaptive antenna array technique as the element technology. In this system, a base station 10 is provided with at least a plurality of antennas, as shown in FIG. 6. When each antenna of the base station 10 receives radio waves from a wireless communication terminal 1, the base station 10 analyzes the reception condition of the received radio waves and adaptively controls a radio wave reception level and a phase of each antenna according to the change of radio wave environment. As shown in FIG. 6, the base station 10 directs a point with maximal directivity to a direction where communication is to be performed (beam forming) so as to emphasize a desired wave, while it allocates an anti-phase wave in a direction of interference wave and forms a point where the directivity is declined (null point) so as to avoid interference. Therefore, disturbing waves from other systems or other terminals are removed and thus interference can be suppressed, which enables the favorable communication environment with a high data rate.

Moreover, this system also uses SDMA (Space Division Multiple Access (hereinafter abbreviated as "space multiplex")) technique as the element technology. This expands the adaptive antenna array technique to a plurality of beams, and thereby a plurality of wireless communication terminals 1, 2 and 3, for example, can be accommodated in the same channel in a cell covered by the base station 10, as shown in FIG. 7. This technique makes it possible to communicate different data with other terminals at the same timing using the same frequency, as disclosed in Japanese Patent Application Laid-Open No. 2001-507889 and Japanese Patent Application Laid-Open No. 2002-58061, for example. In fact, PHS, HC-SDMA and the like use these techniques.

Next, the channel configuration proposed as HC-SDMA by WTSC-2005-032 of ANSI/ATIS will be explained with reference to a schematic view of FIG. 8. In HC-SDMA, Frequency Division Multiple Access (FDMA) divides a 5 MHz frequency band to eight frequency channels of $f_1$ to $f_8$, each of which has a frequency of 625 kHz.

Moreover, each of frequency channels $f_1$ to $f_8$ is provided with three time slots in the depth direction of the drawing by Time Division Multiplex (TDM). The time axis in the depth direction of the drawing, which is enlarged as a horizontal axis, is shown in the lower portion of the drawing. Each frequency channel is provided with three Uplink slots, each of which is of 545 μs, and three Downlink slots, each of which is of 1090 μs, so that Time Division Duplex (TDD) is achieved.

Furthermore, space multiplex enables a base station to communicate with a plurality of terminals at the same time on each of frequency channels $f_1$ to $f_8$. Hereinafter, the channel by this space multiplex (Spatial Channel) will be abbreviated as simply "SC", and when the base station can communicate with three terminals at the same time on each frequency channel, for example, the frequency channel is represented as "3SC".

Therefore, in the whole of 5 MHz frequency band, as shown in FIG. 9, each of eight frequency channels has three time slots and further each sub channel is 3SC, and thus the theoretical channel is of 8[Frequency Channels]×3[Time Slots]×3[Spatial Channels]=72[streams]. In fact, since the first time slot in a specific frequency channel is used as a control channel, the channels on which a base station actually connects terminals and which can be used by a user for communication are 69 [streams].

Therefore, the data rate of each stream can reach 354 kbps/115 kbps (Downlink/Uplink) when the radio wave condition is favorable.

DISCLOSURE OF THE INVENTION

Problems to be Solved by the Invention

However, as the number of terminals connected to the same base station wirelessly increases, there occurs a problem that comfortable communication is hindered due to co-channel interference or the like. When wireless communication terminals in the same cell of the base station 10 increase and a number of wireless communication terminals exist therein, the space multiplex by the base station enables a plurality of wireless communication terminals to communicate in a channel at the same frequency and the same timing, which improves frequency usage efficiency. However, in this space multiplex, it is important to remove co-channel interference constantly, and unless the channel for each wireless communication terminal can be divided stably in any radio wave environment, the communication quality is deteriorated, such as the decline in data rate. If the number of multiplexes of the space multiplex or the like is decreased so as not to deteriorate the communication quality, the frequency usage efficiency is then deteriorated.

Therefore, in the view of the above problem, an object of the present invention is to provide a wireless communication apparatus and a wireless communication method securing QoS (Quality of Service) for each user of a wireless communication terminal without deteriorating the frequency usage efficiency and not lowering the satisfaction with the communication quality.

SUMMARY OF THE INVENTION

The first aspect of the invention to achieve the above object is to provide a wireless communication apparatus having a plurality of frequency channels and being capable of wireless communication with a plurality of different terminals, including:

a rank recognition unit for recognizing a rank indicating a priority of communication quality of the terminal; and a channel allocation control unit for allocating a different frequency channel to a terminal in a different rank based on a recognized rank.

The second aspect of the invention is to provide the wireless communication apparatus according to the first aspect, wherein the channel allocation control unit allocates a predetermined frequency channel depending on the rank indicating a priority of communication quality of the terminal.

The third aspect of the invention is to provide the wireless communication apparatus according to the first aspect, wherein the channel allocation control unit allocates, when there is a connection request from the terminal, a different frequency channel to the terminal in a different rank depending on a usage state of frequency channels.

Furthermore, the fourth aspect of the invention to achieve the above object is to provide a wireless communication method of a wireless communication apparatus having a plurality of frequency channels and being capable of wireless communication with a plurality of different terminals, including steps for:

recognizing a rank indicating a priority of communication quality of the terminal; and allocating a different frequency channel to a terminal in a different rank based on a recognized rank and performing communication.

The fifth aspect of the invention is to provide the wireless communication method according to the fourth aspect, further including steps for:

sharing information regarding a usage state of the frequency channels in an adjacent wireless communication apparatus between adjacent wireless communication apparatuses; and controlling a frequency channel allocation when the terminal executes handover, based on shared information regarding the usage state of the frequency channels.

BRIEF DESCRIPTION OF DRAWINGS

FIG. 2 is a table illustrating a specification example of various wireless communication services according to the first embodiment;

FIG. 3 is a schematic view explaining the channel multiplex of the first embodiment;

FIG. 9 is a schematic view explaining the channel multiplex of HC-SDMA.

DESCRIPTION OF EMBODIMENTS

Preferred embodiments of the invention will be described with reference to the accompanying drawings.

First Embodiment

Figure 1:
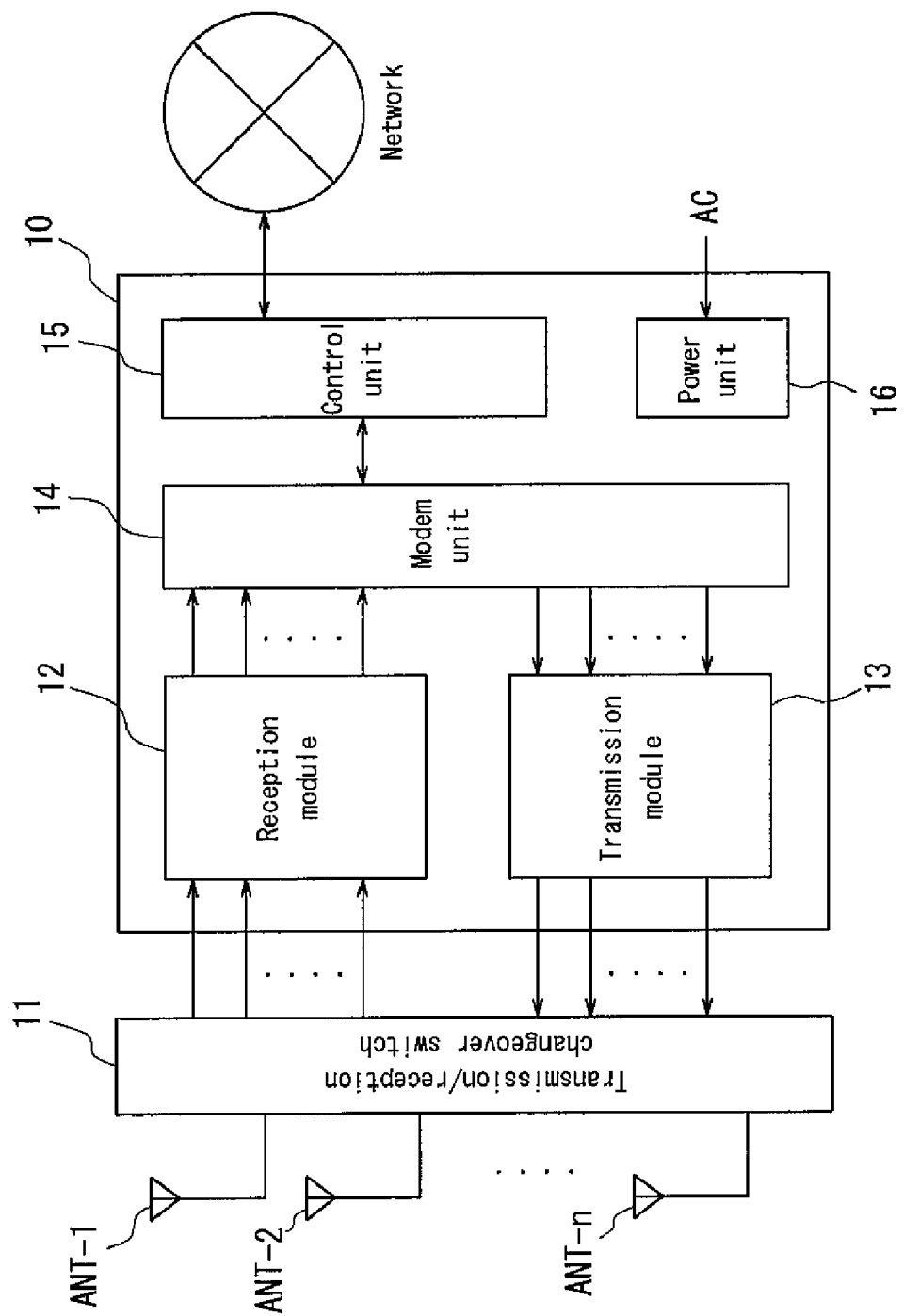
FIG. 1 is a block diagram illustrating a schematic configuration of a main part of a base station 10 according to the first embodiment.

FIG. 1 is a block diagram illustrating a schematic configuration of a main part of a base station 10 for wireless communication which is a wireless communication apparatus according to the first embodiment of the present invention. It is noted that the base station 10 according to the first embodiment basically has a configuration approximately same as of a known base station used for wireless communication systems such as PHS, i-Burst (registered trademark) and the like, but a configuration of a control unit 15 and its control are mainly different.

The base station 10 of this embodiment is provided with n (n is a natural number equal to or greater than 2) antennas of ANT-1 to ANT-n, and these antennas ANT are connected to a transmission/reception changeover switch 11 as shown in FIG. 1. The transmission/reception changeover switch 11 switches between transmission and reception by time division for these antennas ANT-1 to ANT-n. A reception module 12 and a transmission module 13 are connected to the transmission/reception changeover switch 11.

The reception module 12 comprises n low-noise amplifiers, n down converters and n A/D converters for antennas ANT-1 to ANT-n respectively, although they are not shown. Similarly, the transmission module 13 comprises n D/A converters, n upper converters and n multiplier circuits for antennas ANT-1 to ANT-n respectively, although they are not shown. Then, when the space multiplex is applied to communication with two wireless communication terminals, the multiplier circuit is used, enabling signals to be transmitted to each wireless communication terminal with different weight.

A modem unit 14 performs modulation and demodulation of transmission/reception data and phase control by digital signal processing. This modem unit 14 is connected to the control unit 15 and exchanges information with network via the control unit 15. The control unit 15 controls the whole of the base station 10. A power unit 16 is supplied with AC100V power, converts it to a predetermined DC voltage, and supplies the DC voltage to each unit of the base station 10.

The base station 10 uses, for transmission, an adaptive array antenna system which performs transmission with a predetermined weight for each antenna based on reception signals (amplitude and phase) received from n antennas, so that the space multiplex is achieved. This base station 10 communicates wirelessly with each wireless communication terminal (not shown), and the wireless communication terminal itself is the same as conventional ones. The description will be thus omitted.

Next, the offer of wireless communication service for users of each wireless communication terminal will be described.

In this embodiment, at the time of contract with a user for initiating a wireless communication service, a wireless communication service provider offers a plurality of communication services which are different one another in price and communication quality, as shown in FIG. 2 as an example, and lets the user select a favorable service among various services to conclude the contract. In the example of FIG. 2, a wireless communication service provider offers four kinds of services, and the price is set to be higher as the communication quality of the wireless communication service becomes higher. That is, users are categorized based on the communication quality rank according to the service with different price, so that users in higher rank can preferentially receive the service with higher communication quality.

For example, in FIG. 2, the service called "platinum user" which is the highest rank provides the highest communication quality among these four courses and the price thereof is set to be the highest. On the contrary, the service called "bronze user" which is the lowest rank provides the lowest communication quality among these four courses and the price thereof is set to be the lowest.

Next, the channel allocation in the base station 10 will be described.

A memory unit (not shown) included in the control unit 15 of the base station 10 is set to store beforehand a table like one shown in FIG. 3, for example, for specifying a user's channel to be allocated to each wireless communication service. When a wireless communication terminal moves into an area where the terminal can receive radio waves of the base station 10 and performs wireless communication with the base station 10, the control unit 15 identifies which wireless communication service among those in FIG. 2 is applied to the wireless communication terminal under the contract, based on identification information of the wireless communication terminal. Thus, the control unit 15 includes a rank recognition unit (not shown) for recognizing a rank which indicates the priority of communication quality for the terminal. Once a communication service for the wireless communication terminal is identified, the control unit 15 determines, when initiating wireless communication, a frequency for communication with the wireless communication terminal based on the correspondence between each service and frequency in the table of FIG. 3. Thus, the control unit 15 also includes a channel allocation control unit (not shown) for allocating, based on a recognized rank, a different frequency channel to a terminal in a different rank.

That is, when a terminal initiating communication is under the service for "bronze user", a frequency channel to be used is limited to $f_1$ or $f_2$ among eight channels. Moreover, when a terminal initiating communication is under the service for "platinum user", a frequency channel to be used is limited to $f_7$ or $f_8$. As above, communication is established using a different frequency depending on the service rank of wireless communication, which eliminates the case where wireless communication terminals in different rank of communication services under the contract by users use the same frequency for wireless communication.

Furthermore, as shown in FIG. 3, the frequency channels $f_7$ and $f_8$ for the service for platinum user are set to have small number of space multiplexes like 1 (1SC), for example, while the frequency channels $f_1$ and $f_2$ for the service for bronze user are set to have relatively large number of multiplexes like 4 (4SC), for example. As above, the number of space multiplexes is set to decrease sequentially as the rank of service is higher, that is, as the service is set to cost more. This setting boosts, in the communication service in a high rank with high cost, the exclusive rate in one channel since the number of space multiplexes is small, which makes it possible to provide a communication service with high communication quality by suppressing the co-channel interference. The communication service in a lower rank has larger number of space multiplexes and thus the communication quality is inferior to the communication service in a higher rank, which enables, however, reasonable service.

Second Embodiment

Next, the second embodiment of the present invention will be described.

The base station 10 according to the second embodiment basically has a configuration approximately same as the base station 10 used for the first embodiment, but a configuration of the control unit 15 and its control are different.

In the second embodiment, unlike the first embodiment, a table for specifying a channel to be allocated to each wireless communication service according to rank, is not stored in the memory unit beforehand. Instead, the channel is determined dynamically when initiating communication with a wireless communication terminal under each communication service.

Figure 4:
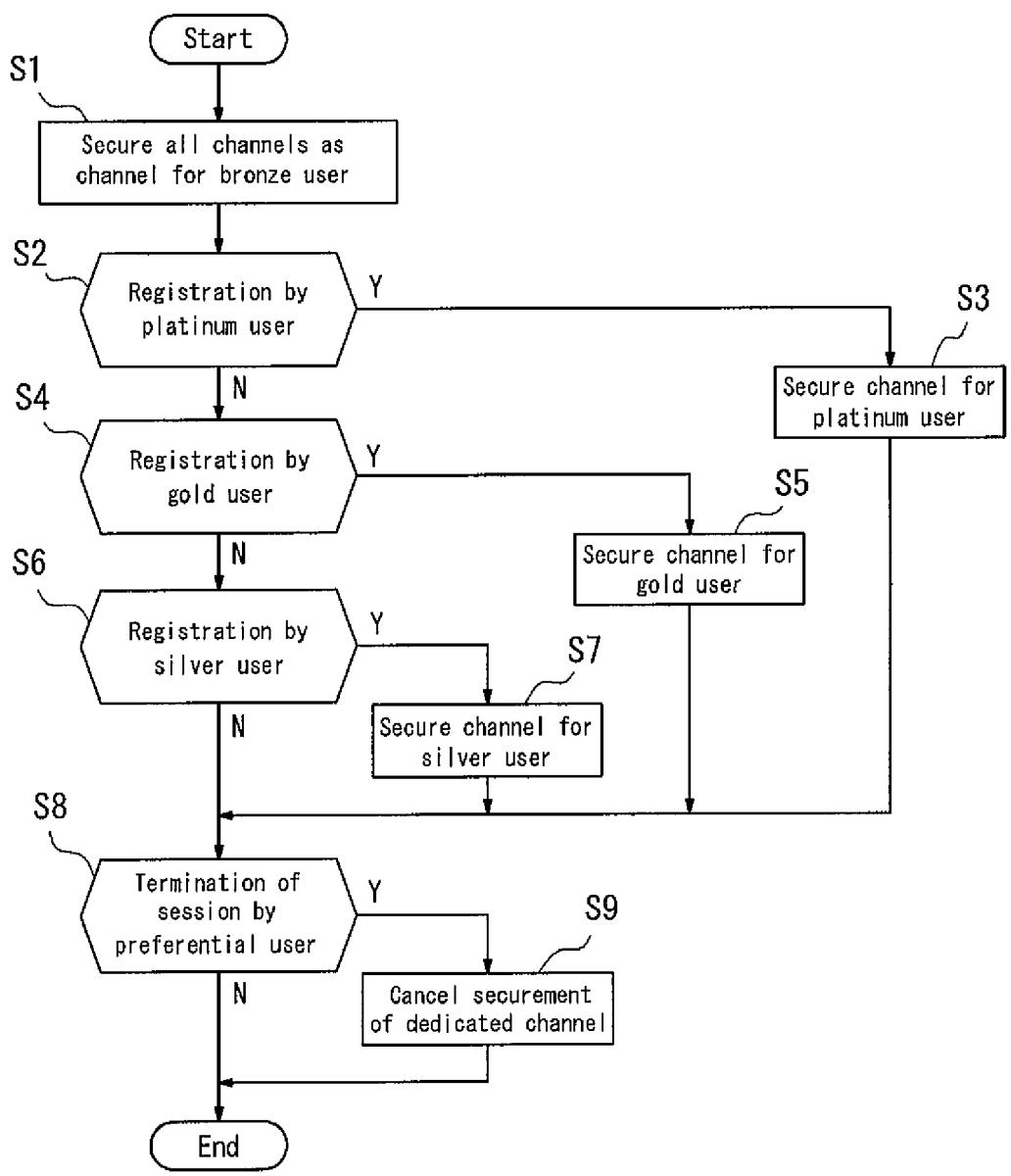
FIG. 4 is a flow chart explaining a channel multiplexing process of the second embodiment.

The channel allocation control according to the second embodiment will be described with reference to the flow chart of FIG. 4.

First at Step S1, if there is an available frequency channel in the base station 10 when the base station 10 receives a connection request from a wireless communication terminal upon initiation of communication, a user of any rank can initiate communication using the frequency channel. That is, even in the service for bronze user which is the lowest rank, wireless communication is performed using any frequency channel if available.

Next, when there is a connection request from a wireless communication terminal under the contract of a higher rank of service, e.g. the service for platinum user (Step S2), a frequency channel with the number of space multiplexes being 1, for example, is secured (Step S3) and wireless communication is initiated. Thus, a channel is secured preferentially before terminals in other ranks of service, except for the case where all of frequency channels are occupied for platinum users.

Moreover, when there is a connection request from a wireless communication terminal under the contract of the next higher rank of service, e.g. the service for gold user (Step S4), a frequency channel with the number of space multiplexes being 2, for example, is secured (Step S5) and wireless communication is initiated. Thus, a channel is secured preferentially before terminals in lower ranks of service, except for the case where all of frequency channels are occupied for platinum users or gold users.

Furthermore, when there is a connection request from a wireless communication terminal under the contract of the next higher rank of service, e.g. the service for silver user (Step S6), a frequency channel with the number of space multiplexes being 3, for example, is secured (Step S7) and wireless communication is initiated. Thus, a channel is secured preferentially before terminals in the service for bronze user, except for the case where all of frequency channels are occupied for platinum users, gold users or silver users.

When wireless communication by service except service for user in the lowest rank, namely the service for blond user in this example, is terminated (Step S8), the securement of the frequency channel used in the wireless communication is cancelled (Step S9) and the channel is prepared for a connection request from the next wireless communication terminal.

As above, in this embodiment, a channel for the service with high priority is not secured beforehand, and a frequency channel with the number of space multiplexes according to the service rank is dynamically allocated at the time of connection request from a wireless communication terminal under the contract of service with higher priority. Thus, there is no case where a channel for service in a higher rank which is secured beforehand is not used, which can further improve the frequency usage efficiency.

Furthermore, if a frequency channel is dynamically allocated as above, it is possible to prevent trouble that, when there are a number of connection requests for the service with high priority like one for platinum user, for example, channels are not available for the service for platinum user although there are unused frequency channels for the service in a rank with relatively low priority.

Third Embodiment

Next, the third embodiment of the present invention will be described.

In the third embodiment, adjacent base stations share information on the table of channels previously allocated according to each wireless communication service, which has been described in the first embodiment, or information on the table formed by allocating a frequency channel dynamically, which has been described in the second embodiment. Therefore, the base station 10 of this embodiment basically has a configuration approximately same as the base station 10 used for the first and second embodiments, but a configuration of the control unit 15 and its control are different.

In the base station 10 illustrated by the block diagram of FIG. 1 in the first embodiment, the control unit 15 is connected to network. The base station 10 used in the third embodiment communicates with other adjacent base stations via the network and can thus refer to various information stored in memory units of the base stations. Various information referred to here is supposed to be information on channel configuration currently controlled by the base station, information on service rank of each wireless communication terminal which has been already registered, information on a wireless communication terminal which has made a connection request and the like, and these are referred as needed.

When communication between adjacent base stations is performed, in a system having no control unit for controlling a plurality of base stations, it is conceivable that the system is configured so that communication is performed between base stations. Moreover, in a system having a control unit for controlling a plurality of base stations, it is also possible to configure the system so that above various information is provided from the control unit and each base station receives it.

Figure 5:
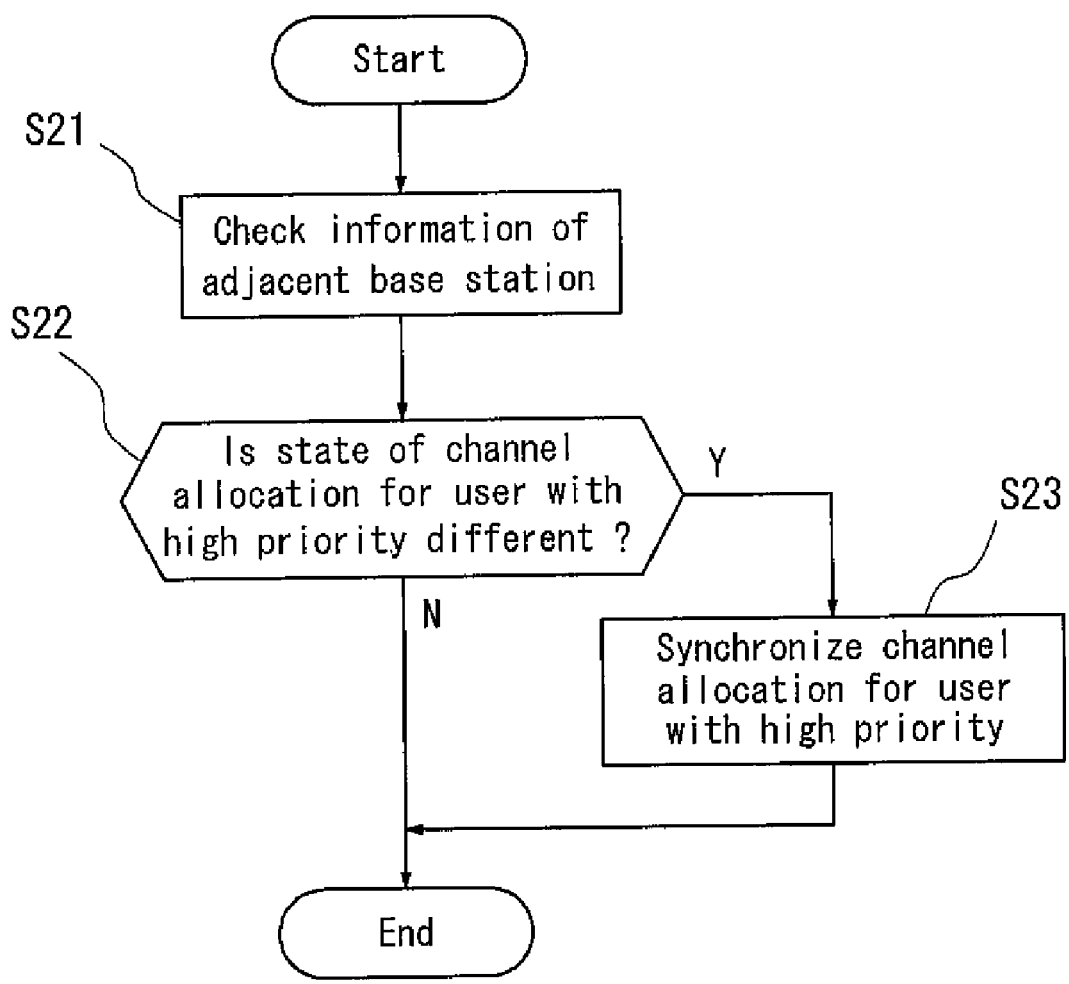
FIG. 5 is a flow chart explaining the channel-usage state sharing process of the third embodiment.
Figure 6:
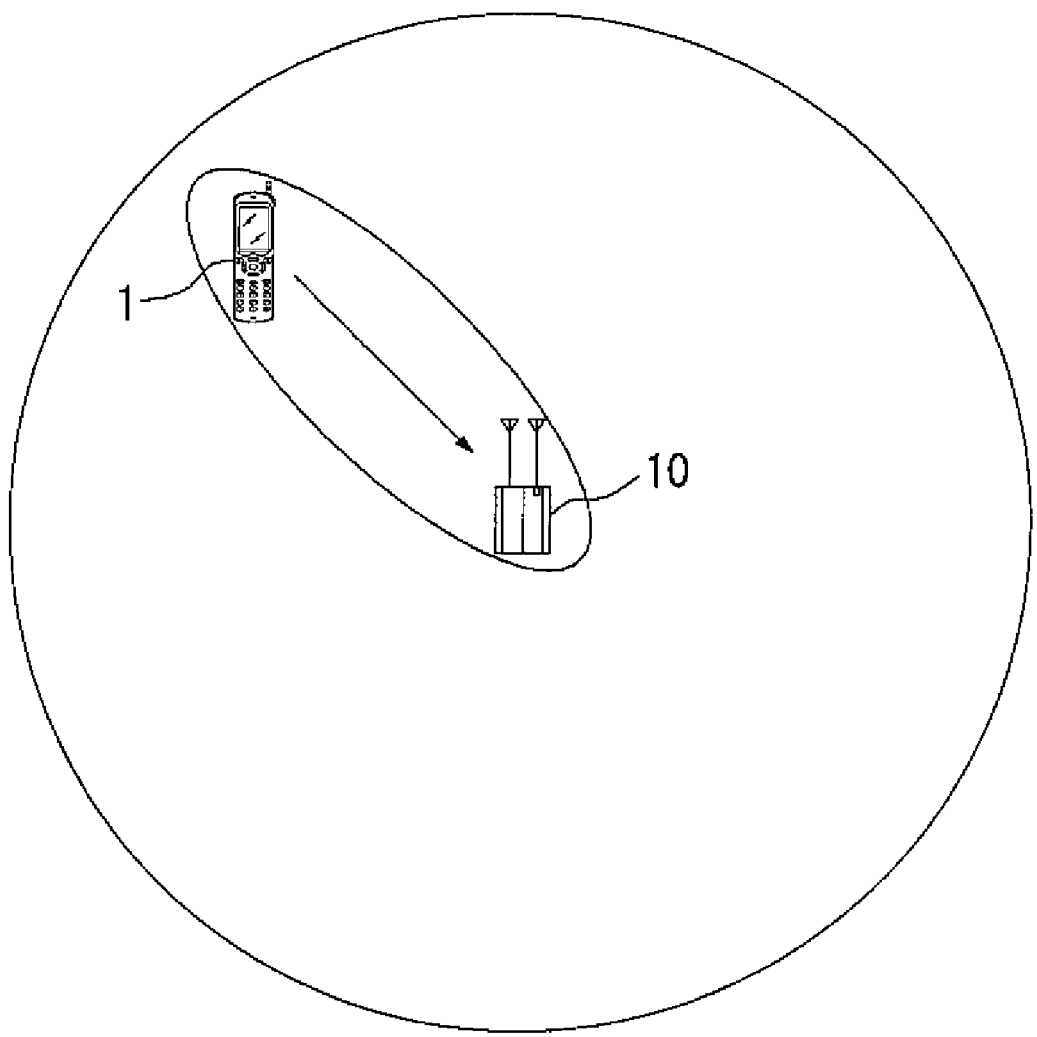
FIG. 6 is a schematic view explaining the adaptive antenna array.
Figure 7:
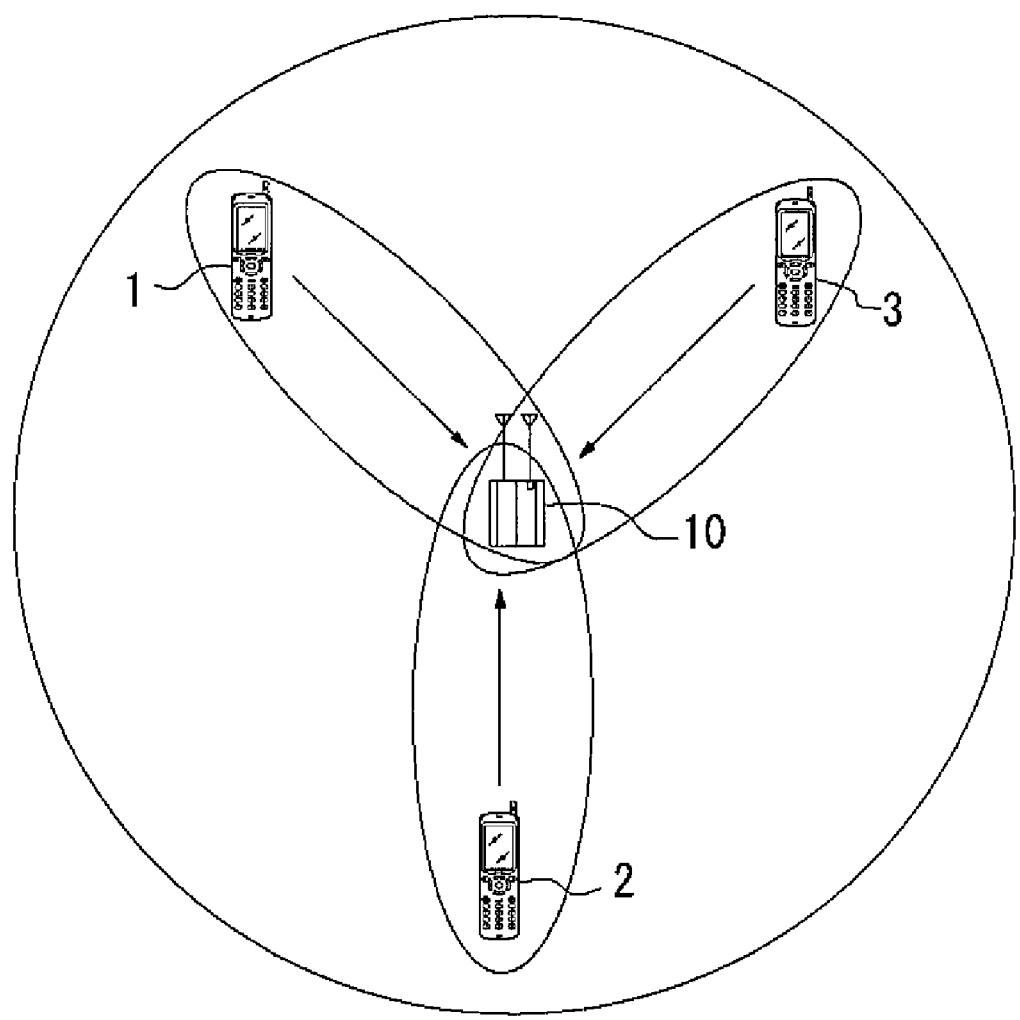
FIG. 7 is a schematic view explaining the space multiplex.
Figure 8:
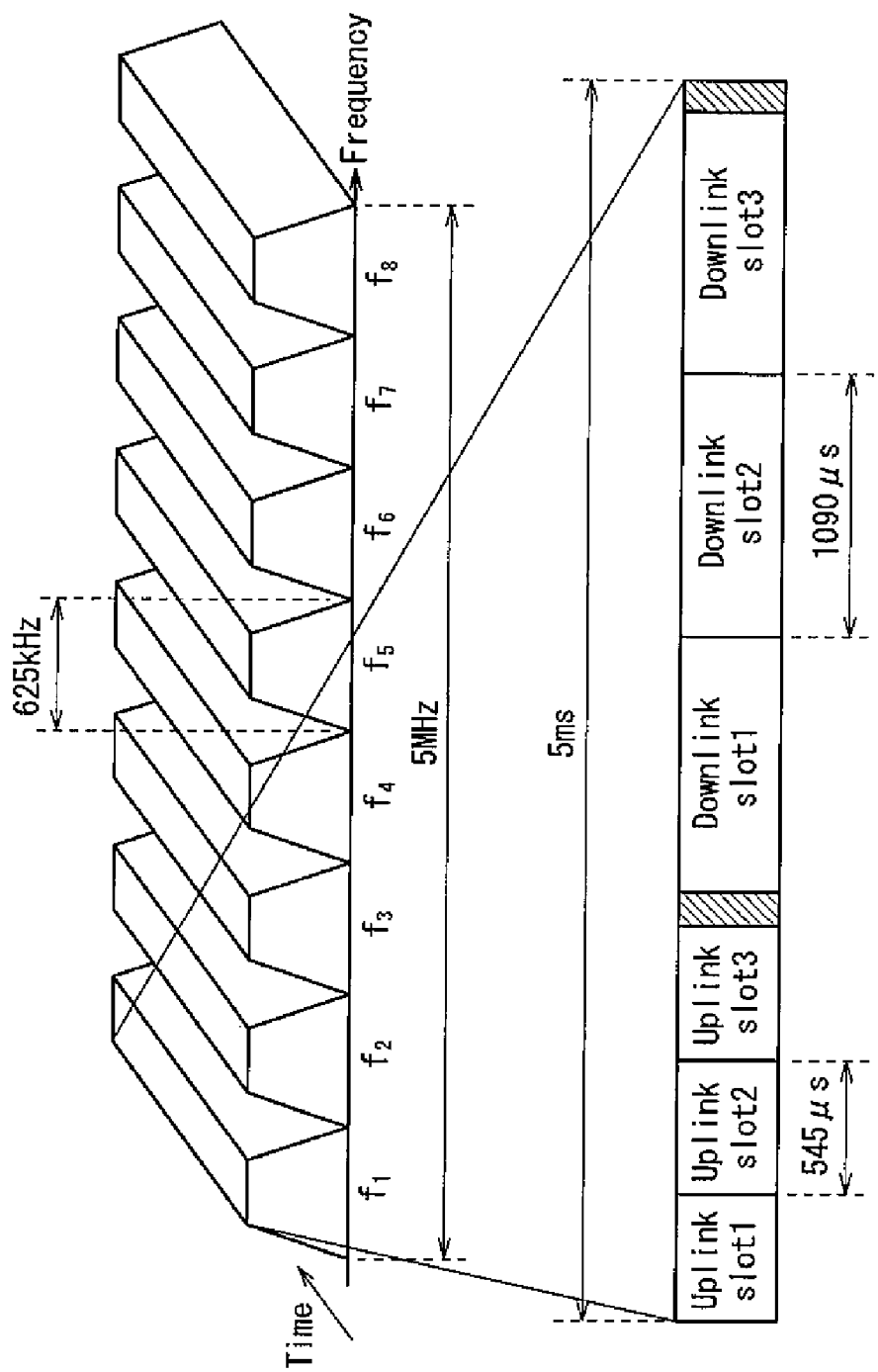
FIG. 8 is a schematic view explaining the channel configuration of HC-SDMA.

Next, there will be described the main part of the process for sharing information on channel configuration between adjacent base stations according to the third embodiment, with reference to the flow chart of FIG. 5.

First at Step S21, the control unit 15 of a base station 10 checks information on channel configuration in a base station, which is stored in a memory unit of each base station (not shown) adjacent to the own station. Next, based on information obtained as a result of this check, it is determined whether the state of channel allocation for the service with high priority, i.e. service in a high rank is different from one stored in the memory unit of the own station (Step S22). As a result of the determination, when the channel allocation state is different from one stored in the memory unit of the own station, information is synchronized (Step S23) to share information of the own station and information of the adjacent base station (information regarding the usage state of frequency channels). This is a step where adjacent wireless communication apparatuses share information regarding the usage state of frequency channels in the adjacent wireless communication apparatus. That is, by controlling so that the same channel allocation is performed in a plurality of adjacent base stations, it is possible to secure a frequency channel for a terminal in communication service with high priority, even in a cell of a base station to which the terminal executes handover. Thus, the communication quality can be maintained.

Furthermore, by sharing information of the own base station and that of the adjacent base stations, a plurality of adjacent base stations are controlled to perform the same channel allocation. This is a step where a different frequency channel is allocated to a terminal in a different rank based on a recognized rank to perform communication. In this case, the plurality of adjacent base stations are controlled so that a channel with the same frequency and at the same timing as the channel which one base station has allocated for a terminal remains vacant without allocating it to another terminal.

It is noted that, with respect to the timing for checking information of the adjacent base station, there may be set in embodiments various timing, depending on needs, such as predetermined timing, regular timing, timing when a predetermined event occurs, e.g. when there is a connection request from a wireless communication terminal, or the like.

With the above control, when a plurality of base stations exist adjacent to one another, each base station can achieve communication excluding usage of a channel with the same frequency and at the same timing for another wireless communication terminal, so that the co-channel interference among cells can be avoided.

It is noted that the present invention is not limited to the above embodiments, and many variations and modifications can be implemented. For example, in the above each embodiment, when the wireless communication terminal sends a connection request to the base station 10, the control unit 15 identifies a wireless communication service under the contract for the wireless communication terminal based on identification information of the wireless communication terminal by referring to the memory unit of the control unit 15. However, it can be supposable, depending on a system configuration, that a wireless communication terminal includes an indicator enabling identification of a service.

Moreover, in the above each embodiment, even when one frequency is space-multiplexed, all channels in the frequency are used for the service in the same rank. However, when there are multiplexes to spare in such channels, the channels may be set to be used for the service in the adjacent rank also, for example, without exceeding the number of multiplexes which is set according to each service rank.

That is, when one frequency channel has three space multiplexes at a maximum, instead of three terminals under the contract of service for silver user of 3SC being connected at the same time, it is conceivable to configure the system so that one terminal under the service for silver user of 3SC and two terminals under the service for bronzed user of 4SC can be connected at the same time, or so that two terminals under the service for silver user of 3SC and one terminal under the service for bronze user of 4SC can be connected at the same time.

INDUSTRIAL APPLICABILITY

According to the present invention, a rank indicating a priority of communication quality of wireless communication terminals is set and, depending on the rank, a different frequency channel is allocated to a terminal in a different rank. Thus, it becomes possible to ensure QoS corresponding to each service rank in the wireless communication with each terminal. Therefore, it is possible to provide more fine-tuned wireless communication service according to user's communication using purpose, cost or the like, and the satisfaction with the communication quality of a user who selects each service is not lowered.

The invention claimed is:

1. A wireless communication apparatus having a plurality of frequency channels and being capable of wireless communication with a plurality of different terminals, comprising:
    a control unit for allocating a different frequency channel to a terminal in a different rank depending on a rank indicating a priority of communication quality of the terminal; and
    an information sharing unit for sharing information regarding a usage state of the frequency channels between adjacent wireless communication apparatuses,
    wherein the control unit controls a frequency channel allocation when the terminal executes handover, based on information shared in the information sharing unit regarding the usage state of the frequency channels.

2. A wireless communication method of a wireless communication apparatus having a plurality of frequency channels and being capable of wireless communication with a plurality of different terminals, comprising steps for:
    recognizing a rank indicating a priority of communication quality of the terminal;
    allocating a different frequency channel to a terminal in a different rank based on a recognized rank and performing communication;
    sharing information regarding a usage state of the frequency channels in an adjacent wireless communication apparatus between adjacent wireless communication apparatuses; and
    controlling a frequency channel allocation when the terminal executes handover, based on shared information regarding the usage state of the frequency channels.

* * * * *